(12) United States Patent
Saunders

(10) Patent No.: US 8,509,620 B1
(45) Date of Patent: Aug. 13, 2013

(54) SYSTEM AND METHOD FOR DENSE WAVELENGTH DIVISION MULTIPLEXING OPTICAL SERVICE CHANNEL USAGE

(75) Inventor: Brian D. Saunders, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1947 days.

(21) Appl. No.: 10/900,568

(22) Filed: Jul. 28, 2004

(51) Int. Cl.
*H04J 14/02* (2006.01)

(52) U.S. Cl.
USPC .......................................................... 398/79

(58) Field of Classification Search
None
See application file for complete search history.

(56) References Cited

U.S. PATENT DOCUMENTS

| | | | | |
|---|---|---|---|---|
| 5,910,959 A | * | 6/1999 | Olafsson et al. | 714/752 |
| 6,504,631 B1 | * | 1/2003 | Barry et al. | 398/83 |
| 6,940,863 B2 | * | 9/2005 | Xue et al. | 370/401 |
| 7,031,299 B2 | * | 4/2006 | Chaudhuri et al. | 370/352 |
| 7,257,120 B2 | * | 8/2007 | Saunders et al. | 370/395.21 |
| 2003/0063345 A1 | * | 4/2003 | Fossum et al. | 359/118 |
| 2003/0128978 A1 | * | 7/2003 | Hemenway et al. | 398/2 |
| 2004/0047295 A1 | * | 3/2004 | Morreale | 370/241 |
| 2004/0208591 A1 | * | 10/2004 | Willebrand et al. | 398/115 |
| 2004/0258143 A1 | * | 12/2004 | Jones et al. | 375/222 |
| 2005/0002671 A1 | * | 1/2005 | Smith et al. | 398/83 |
| 2006/0146747 A1 | * | 7/2006 | Shpak | 370/328 |
| 2006/0210274 A1 | * | 9/2006 | Lichtman et al. | 398/83 |

OTHER PUBLICATIONS

Newton's Telecom Dictionary, Item "order wire", Telecom Books, 1998.*

* cited by examiner

*Primary Examiner* — Shi K Li

(57) ABSTRACT

A system and method for utilizing the optical service channel for secondary communications without impacting the system communications passing along the channel is disclosed. The secondary communications are combined with the system communications and injected onto the optical service channel. The system communications are given a higher priority than the secondary communications to ensure that the system communications are given the required bandwidth.

11 Claims, 4 Drawing Sheets

SYSTEM AND METHOD FOR DENSE WAVELENGTH DIVISION MULTIPLEXING OPTICAL SERVICE CHANNEL USAGE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

Dense wavelength division multiplexer (DWDM) optical line amplifiers (also known as optical amplifiers) are used to amplify the optical signals in optical fibers. The Optical amplifiers are currently not meant to add or drop capacity to the DWDM composite stream. Typically the optical amplifiers are placed in locations where capacity demands are minimal or non-existent. The minimal demand typically does not justify the cost of a tributary service carrying element such as a terminal or an optical add-drop multiplexer. Many Optical amplifiers have an optical service channel service module that terminates an optical service channel. The optical service channel (OSC) is a discrete channel that typically operates at the 1510 nm wavelength and is typically electronically separated from the DWDM composite signal. This channel is currently used for system communications that may comprise operation, administration, maintenance and provisioning communications. The current optical service channel configuration is not designed to enable utilization of the channel for customer and internal user communications. Any communications added to the current optical service channel at an optical service channel service module may compete with and may delay the system communications. Typically the system communications do not require the full bandwidth of the optical service channel. It would be useful to access the excess bandwidth in the optical service channel without the danger of delaying the system communications.

Therefore there is a need for a system and method for utilizing the optical service channel for internal secondary communications without impacting the system communications passing along the channel.

SUMMARY OF THE INVENTION

A system and method for utilizing the optical service channel for secondary communications without impacting the system communications passing along the channel is disclosed. The secondary communications are combined with the system communications and injected onto the optical service channel. The system communications are given a higher priority than the secondary communications to ensure that the system communications are given the required bandwidth.

DETAILED DESCRIPTION OF THE PREFERRED EMBODIMENT

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
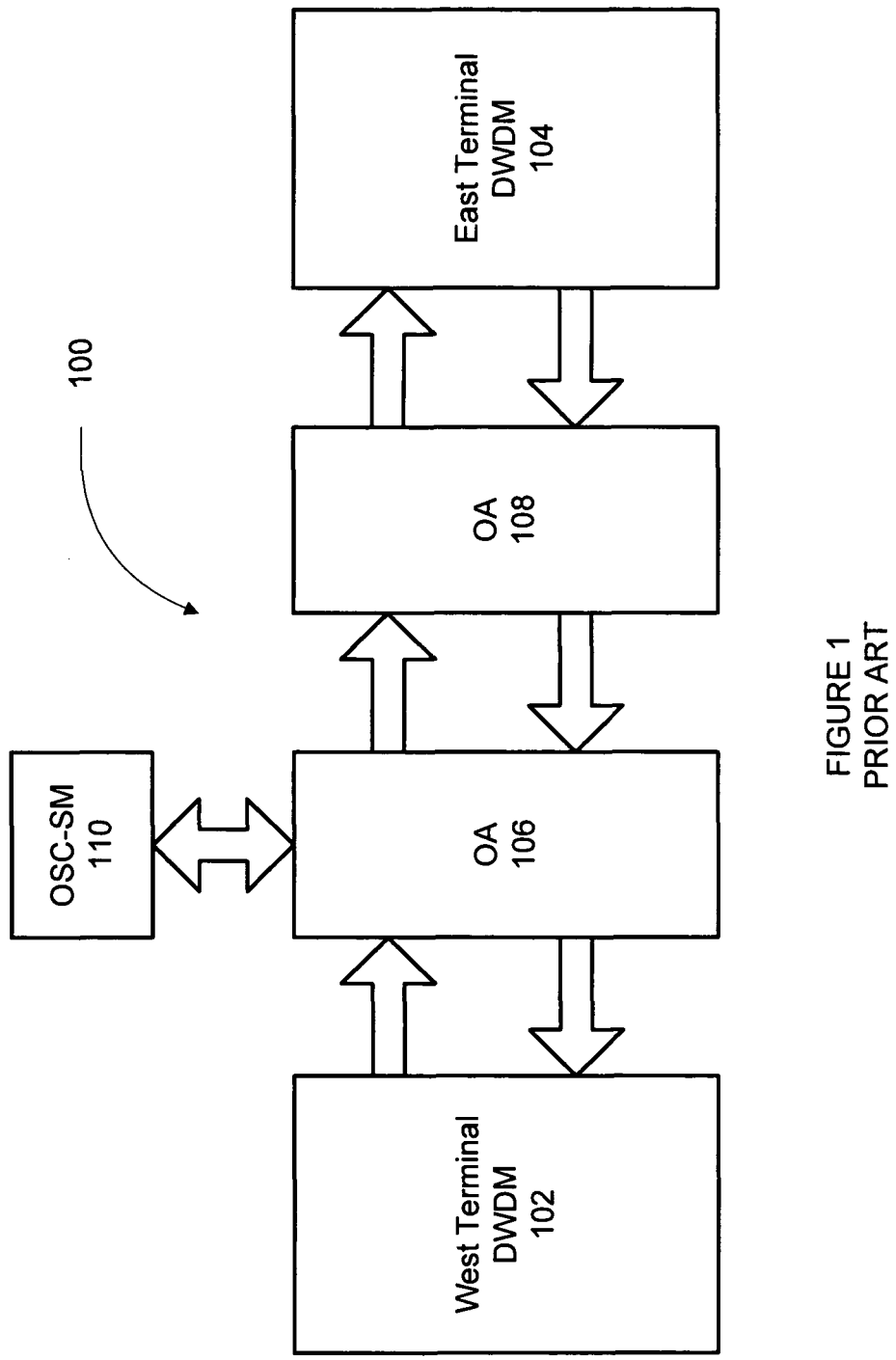
FIG. 1 is a prior art block diagram of a communication system.

FIG. 1 illustrates a prior art communication system 100. Communication system 100 includes west terminal 102, east terminal 104, optical amplifiers 106 and 108, and optical service channel (OSC) service module 110. The east terminal 104 and the west terminal 102 are Dense Wavelength Division Multiplexer (DWDM) terminals, Wavelength Division Multiplexer (WDM) terminals, Wide Wavelength Division Multiplexer (WWDM) terminals, or the like. The west terminal 102 is optically connected to optical amplifier 106. Optical amplifier 106 is optically connected with OSC service module 110 and with optical amplifier 108. Optical amplifier 108 is optically connected with east terminal 104. An optical service channel is accessed through the OSC service module linked to optical amplifier 106. There may be numerous additional optical amplifiers between the east and west terminals of the system, however only two are shown for clarity. In use, system communications may be sent or received at the OSC service module, using the optical service channel. The system communications may comprise operation, administration, maintenance and provisioning communications. There may be a desire to send additional or secondary communications from the OSC service module using the optical service channel. An example of these secondary communications may be customer communications and/or internal user communications. Using the current system, the secondary communications may compete for bandwidth on the optical service channel with the system communications. The competition for bandwidth may occur at layer 3, the TCP/IP layer. Adding secondary communications to the optical service channel that may delay or displace the system communications may cause difficulties in the system.

Figure 2:
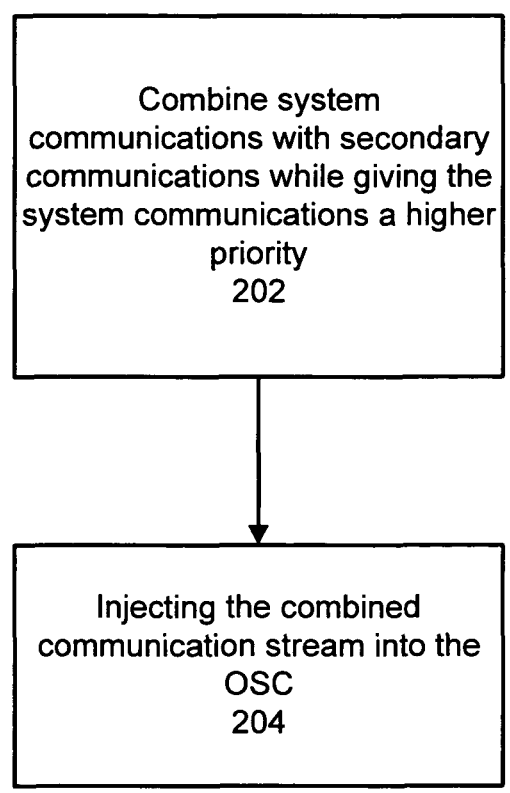
FIG. 2 is a flow chart of a method of accessing an optical service channel in an example embodiment of the invention.

FIG. 2 is a flow chart for one example embodiment of the current invention. At step 202, secondary communications are combined with system communications in such a way as to give the system communications a higher priority than the secondary communications. Combining multiple communications streams into one communication stream utilizing different priorities for the different communications streams and segregating the multiple streams back into the different individual streams is known as grooming. At step 204 the combined communication streams are injected onto, or read from, the optical service channel at the OSC service module. The secondary communications may comprise customer communications and internal user communications. The customer communications and the internal user communications may also have different priorities that allow different access to the bandwidth of the optical service channel.

Figure 3:
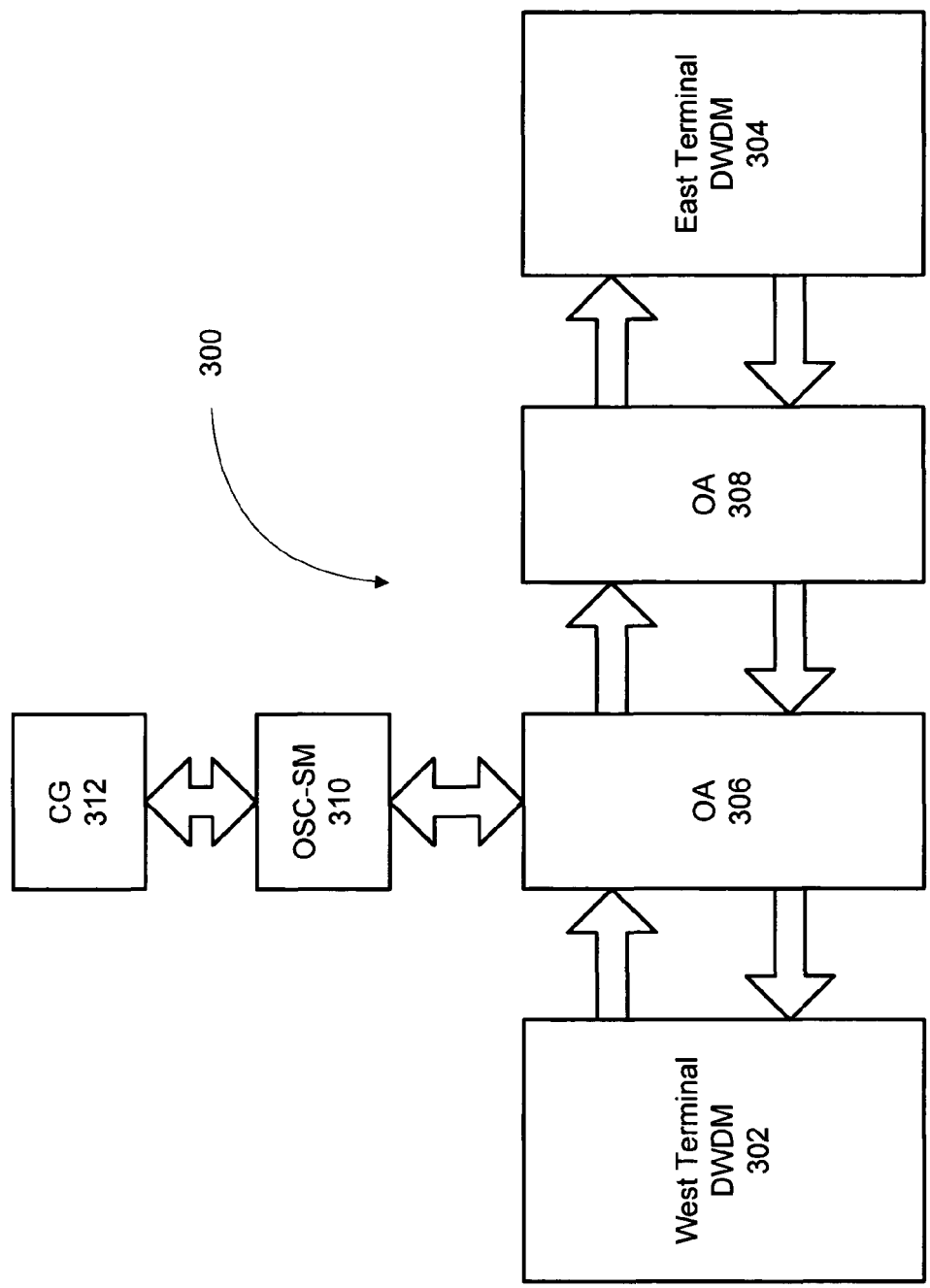
FIG. 3 is a block diagram of a communication system in an example embodiment of the invention.

FIG. 3 is a block diagram of a system in an example embodiment of the current invention. System 300 includes west terminal 302, east terminal 304, optical amplifiers 306 and 308, Channel Groomer (CG) 312, and optical service channel service module (OSC-SM) 310. The east terminal 104 and the west terminal 102 are Dense Wavelength Division Multiplexer (DWDM) terminals, Wavelength Division Multiplexer (WDM) terminals, Wide Wavelength Division Multiplexer (WWDM) terminals, or the like. One example DWDM system that may be used is the Ciena CoreStream DWDM system. The west terminal 302 is optically connected to optical amplifier 306. Optical amplifier 306 is optically connected with OSC service module 310 and with optical amplifier 308. Optical amplifier 308 is optically connected with east terminal 304. Optical service channel service module 310 is connected with channel groomer 312. There may be numerous additional optical amplifiers between the east and west terminals of the system, however only two are shown for clarity.

In operation CG 312 allocates the bandwidth of the optical service channel provided by the OSC service module 310. The bandwidth of the optical service channel is divided between system communications and secondary communications with the system communications having the higher priority. The system communications may comprise operation, administration, maintenance and provisioning communications. The secondary communications may comprise customer communications and internal user communications. The customer communications and the internal user communications may also have different priorities that allow different access to the bandwidth of the optical service channel. In one example embodiment of the invention, the CSU maps the optical service channel at the TDM layer.

Figure 4:
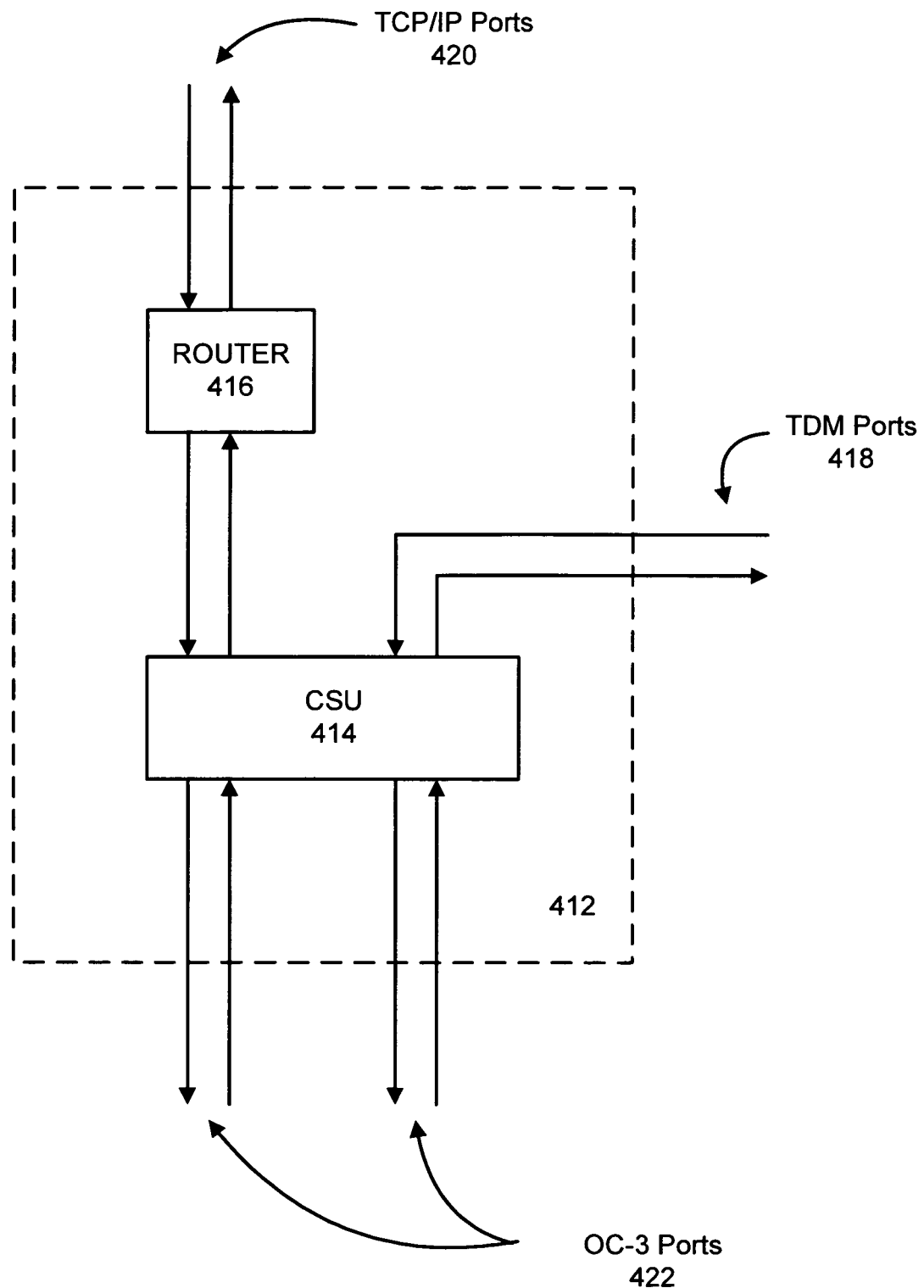
FIG. 4 is a block diagram of a channel groomer in an example embodiment of the invention.

FIG. 4 is a block diagram of a Channel groomer in an example embodiment of the current invention. Channel groomer 412 comprises router 416, Channel service unit (CSU) 414, TDM ports 418, TCP/IP ports 420, and OC-3 ports 422. TCP/IP ports 420 are connected to router 416. Router 416 is connected to CSU 414. TDM ports 418 and OC-3 ports 422 are connected to CSU 414.

In operation, OC-3 ports 422 are connected to an optical service channel service module, allowing access to the incoming and outgoing DWDM optical service channel along an optical communication link. Customer communications and internal user communications would access the optical service channel through TDM ports 418. Customer communications that require TCP/IP routing would access the optical service channel through TCP/IP ports 420 into router 416. System communications may utilize OC-3 ports 422 into and out of CSU 414. Any signals other than the system communications that access the optical service channel are considered secondary communications, for example the internal user communications and the customer communications. CSU 414 prioritizes communications coming from TDM ports 418 and from router 416 before injecting the signals onto the optical service channel through OC-3 ports 422. CSU 414 would give the system communications a higher priority than the secondary communications. CSU 414 may give different priorities to the customer communications and the internal user communications. In another example embodiment of the invention, where TCP/IP routing is not needed, router 416 may be optional. Other port types may also be used dependant on the type of access required by the optical service channel service module.

I claim:

1. A method comprising:
grooming system communications and secondary communications for use on an optical service channel whereby the system communications are given a higher priority and wherein the secondary communications comprise internal user communications and customer communications;
injecting the groomed communications into an optical service channel at a Wave Division Multiplexer (WDM) optical amplifier;
wherein grooming the system communications and the secondary communications comprises utilizing the optical service channel at the WDM optical amplifier for the customer communications by combining the internal user communications and the customer communications with the system communications, where the optical service channel has a bandwidth, and where the internal user communications are given a higher priority than the customer communications; and
providing the system communications with a guaranteed bandwidth.

2. The method of claim 1 where the system communications comprises operation, administration, maintenance and provisioning communications.

3. The method of claim 1 where the WDM optical amplifier is a dense wave division multiplexer optical amplifier.

4. The method of claim 1 where the system communications are given a highest priority.

5. A channel groomer, comprising:
a channel service unit (CSU) configured to send and receive secondary communications through a plurality of ports wherein the secondary communications comprise internal user communications and customer communications;
the CSU connected to a plurality of OC-3 ports;
the CSU configured to combine system communications and the secondary communications and transmit the combined communications on the OC-3 ports; and
the CSU configured to use a higher priority for the system communications, and also configured to provide a guaranteed bandwidth for the system communications, where the internal user communications are given a higher priority than the customer communications.

6. The channel groomer of claim 5, further comprising:
a router configured to send and receive Transmission Control Protocol/Internet Protocol (TCP/IP) communications with a plurality of TCP/IP ports;
the router configured to rout the TCP/IP communications to the CSU; and
the CSU configured to combine the TCP/IP communications with the system communications and the secondary communications for transmission from the OC-3 ports.

7. The channel groomer of claim 5 where the plurality of ports are TDM ports.

8. The channel groomer of claim 5 where the system communications comprise operation, administration, maintenance and provisioning communications.

9. A communication system comprising:
a channel service unit (CSU) configured to send and receive secondary communications through a plurality of ports wherein the secondary communications comprise internal user communications and customer communications;

the CSU connected to an optical service channel service module (OSC-SM);

the OSC-SM configured to access an optical service channel in an optical link, the optical service channel having a bandwidth;

the optical service channel configured to carry system communications;

the CSU configured to combine the secondary communications with the system communications for transmission along the optical service channel;

the CSU configured to allocate the bandwidth of the optical service channel between the system communications and the secondary communications whereby the system communications are given a guaranteed bandwidth; and the CSU configured to give a higher priority to the internal user communications than the customer communications.

10. The communication system of claim 9 further comprising:

a router configured to send and receive Transmission Control Protocol/Internet Protocol (TCP/IP) communications with a plurality of TCP/IP ports;

the router configured to route the TCP/IP communications to the CSU; and the CSU configured to combine the TCP/IP communications with the system communications and the secondary communications for transmission along the optical service channel.

11. A communications system comprising:

a means for combining secondary communications and system communication whereby the system communications have a higher priority than the secondary communications wherein the secondary communications comprise internal user communications and customer communications;

a means for injecting the combined communications onto an optical service channel;

a means for providing the system communications with a guaranteed bandwidth; and a means for giving a higher priority to the internal user communications than the customer communications.

* * * * *